United States Patent [19]

Marzocchi et al.

[11] 4,404,316

[45] Sep. 13, 1983

[54] CHEMICALLY MODIFIED ASPHALT COMPOSITIONS

[75] Inventors: Alfred Marzocchi; Michael G. Roberts; Charles E. Bolen; Edward L. Harrington, all of Newark, Ohio

[73] Assignee: Owens-Corning Fiberglas Corporation, Toledo, Ohio

[21] Appl. No.: 317,719

[22] Filed: Nov. 3, 1981

Related U.S. Application Data

[63] Continuation of Ser. No. 182,332, Aug. 29, 1980, abandoned, which is a continuation-in-part of Ser. No. 166,740, Jul. 7, 1980, abandoned, which is a continuation of Ser. No. 45,048, Jun. 4, 1979, abandoned.

[51] Int. Cl.$^3$ .............................................. C08L 95/00
[52] U.S. Cl. .................................. 524/522; 523/172; 524/526; 524/534; 525/54.5; 260/718; 260/733; 428/391; 428/392
[58] Field of Search ................ 260/28.5 AS, 718, 733; 524/59, 522, 526, 494; 523/172; 427/385 A, 390 A; 428/392, 391; 525/54.5

[56] References Cited

U.S. PATENT DOCUMENTS

| | | | |
|---|---|---|---|
| 3,338,849 | 8/1967 | Johnson | 260/28.5 AS |
| 3,547,850 | 12/1970 | Montgomery | 260/28.5 |
| 3,891,585 | 6/1975 | McDonald | 260/28.5 AS |
| 3,919,148 | 11/1975 | Winters et al. | 260/28.5 AS |
| 3,952,137 | 4/1976 | Türler | 428/489 |
| 4,008,095 | 2/1977 | Fukushima et al. | 106/235 |
| 4,166,752 | 9/1979 | Marzocchi et al. | 428/375 |
| 4,175,978 | 11/1979 | Marzocchi et al. | 260/28.5 AS |
| 4,273,685 | 6/1981 | Marzocchi et al. | 260/28.5 R |

FOREIGN PATENT DOCUMENTS 51-53522  5/1976  Japan.
506855  6/1939  United Kingdom.

*Primary Examiner*—Theodore E. Pertilla
*Attorney, Agent, or Firm*—Ronald C. Hudgens; Robert F. Rywalski; Keith V. Rockey

[57] ABSTRACT

A chemically modified asphalt prepared by reacting an asphalt with a polymerizable vinyl monomer (e.g., styrene) and a rubbery polymer including reclaimed rubber (either natural or synthetic) whereby the rubbery polymer is chemically integrated with the asphalt. The chemically modified asphalt compositions of the invention can be used in the treatment of glass fibers as well as in road paving applications and the like.

16 Claims, No Drawings

CHEMICALLY MODIFIED ASPHALT COMPOSITIONS

This is a continuation of application Ser. No. 182,332 filed Aug. 29, 1980 which is a continuation in part of co-pending application Ser. No. 166,740, filed July 7, 1980, which in turn was a continuation of application Ser. No. 45,048, filed June 4, 1979.

This invention relates to chemically modified asphalt compositions, and more specifically to asphalt compositions which have been chemically modified to increase chemical reactivity to promote compatibility between asphalt and reinforcements therefor.

As is well known to those skilled in the art, asphalt is a cementitius material containing predominantly bitumens which occur in nature as such, or are obtained as the residue in the refining of petroleum. It has been determined that chemically, asphalt is made up of condensed hydrocarbon rings; the condensed hydrocarbon rings, however contain various reactive groups, notably carbon-to-carbon double bonds. In terms of distribution, asphalt is much like a plastisol in that it is formed of graphitic particles suspended in a viscous liquid. The particles are of the same chemical type but differ from each other in molecular weight. Thus, the liquid phase of asphalt is formed predominantly of lower molecular weight condensed hydrocarbon rings, whereas the graphitic particles suspended therein are made up primarily of high molecular-weight condensed organic rings.

Asphalt has been used for may years in road paving applications as well as numerous other uses calling for strong, inert physical and chemical properties such as roofing and the like. An extensive field or use for asphalt now resides in road paving applications in which the asphalt is modified with fillers, and specifically glass fibers which are combined with asphalt or asphalt plus aggregate to increase the strength and wear resistance of road pavements. One of the difficulties, however, in combining glass, either in the form of glass fibers or in the form of fragments of glass, stems from the fact that glass is a highly hydrophilic material. Asphalt, on the other hand, since it is a petroleum derivative, is a highly hydrophobic material. Thus, there exists a basic incompatibility between glass fibers and asphalt by reason of their chemical nature. As a result, it has been difficult to establish any bond, either physical or chemical, between asphalt and glass, notably glass fibers.

It is known, as described in U.S. Pat. No. 4,008,095, that asphalt can be modified by blending with it various materials including coal as well as natural and synthetic elastomers and petroleum resins. One of the difficulties with techniques of the sort that are described in that patent arises from the fact that the resulting blend of asphalt with an elastomeric or resinous modifying agent is not homogeneous, with the result that there is a tendency for the modifying agents to diffuse from the asphalt. Without limiting as to theory, it is believed that the reason for such migration arises from the fact that the modifying agents are not chemically bonded to the asphalt. As a result, it is difficult to obtain a homogeneous system by simply blending such materials with asphalt. That difficulty is compounded when it is desired to reinforce asphalt systems with fillers such as glass fibers since the glass fibers seem to promote diffusion of various components within the asphalt system.

In applications Ser. Nos. 881,108 and 45,047, the latter now being U.S. Pat. No. 4,273,685, there is described a chemically-modified ashalt composition for use in the treatment of glass fibers, as protective coatings in paving and roofing applications which chemically integrates a rubbery polymer with the asphalt. The composition is prepared by reacting, at an elevated temperature (with or without free radical initiator), an asphalt, a polymerizable vinyl monomer and a rubbery polymer whereby the vinyl monomer serves to intertie the rubbery polymer and the asphalt by reaction with ethylenic unsaturation in both the rubbery polymer and asphalt.

While the asphalt systems as described above can be integrated with reinforcement with great success, it is nevertheless a relatively expensive system, in part due to the fact that rubbery polymer increases the cost. It would be highly advantageous, therefore, to find some means to reduce the overall cost of the system without diminishing its effectiveness in bonding to reinforcements.

It is accordingly an object of this invention to provide a chemically modified asphalt system which overcomes the disadvantages described above.

It is a more specific object of this invention to provide a modified asphalt wherein the asphalt molecules are chemically combined with elastomeric materials including reclaimed rubber to thereby improve the performance characteristics of the asphalt and to afford reaction sites whereby the asphalt can be chemically bonded to reinforcements therefor, including glass fibers.

The concepts of this invention reside in the discovery that reclaimed rubber can be effectively used in place of a portion of the rubber polymer in an asphalt system in which asphalt is copolymerized with a rubbery polymer using a polymerizable vinyl monomer. That is a surprising discovery because one skilled in the art would expect, in light of the fact that reclaimed rubber has already been substantially vulcanized or cured, that the reclaimed rubber would have too little reactivity to be interpolymerized with the asphalt to form a system in which the rubber components (e.g., rubbery polymer and reclaimed rubber) are compatible with the asphalt. The chemically modified asphalt composition of this invention is stable even though as much as 75% or more of the rubbery polymer has been replaced by reclaimed rubber.

The resulting chemically-modified asphalt can thus be cross linked through the use of a suitable cross-linking agent. In addition, the rubbery polymer chemically bonded to the asphalt can serve as a source of reaction sites to establish a chemical bond between the chemically modified asphalt and the reinforcing fillers, such as glass fibers, siliceous aggretate or combinations thereof blended with the chemically modified asphalt in reinforced asphalt systems.

As used herein, the term "reclaimed rubber" refers to natural and/or synthetic rubber which have already been substantially vulcanized or cured. Such rubbers are those which have already been combined with compounding or extenders (e.g., carbon black, extender oils, anti-oxidants, etc.). The most common source of reclaimed rubber is vehicle tires from which the reinforcing cord has been removed, and the rubber reduced by mechanical means to a finely divided state. The reclaimed rubbers embodied in the practice of this invention have not been chemically treated, but simply comminuted.

In the preferred practice of the invention, use is made of a vinyl monomer having the general formula:

$$CH_2=CH-R$$

wherein R is an aromatic group such as a phenyl group, a substituted phenyl group wherein the substituent is any one of an amino group, a cyano group, a halogen group, a $C_1$–$C_3$ alkoxy group, a $C_1$–$C_3$ alkyl group, a hydroxy group, a nitro group, etc. R can also be a heterocyclic aromatic group such as a pyridyl group, a quinolyl group or the like. In general, R is an aromatic group containing 6 to 12 carbon atoms.

Preferred is styrene, although various other polymerizable vinyl aromatic monomers can be used. Included are p-aminostyrene, o-methoxystyrene, 2-vinyl pyridine, 3-vinyl quinoline, etc.

As to the rubbery polymer component, use can be made of a number of unvulcanized and uncured (i.e., not completely cured or vulcanized or compounded) elastomeric materials well known to those skilled in the art. Included are natural rubbers as well as synthetic rubbers. Preferred are synthetic rubbers which are homopolymers of a conjugated diene (e.g., butadiene, isoprene, chloroprene, etc.) as well as various polymers which are substituted with a functional group containing a labile hydrogen atom. For example, various hydroxy, amino and like substituted homopolymers of conjugated dienes may likewise be used in the practice of this invention. Such substituted butadienes are commercially available from, for example, Atlantic-Richfield under the trademark "Poly B-D", a series of hydroxy-terminated butadiene polymers; for example, use can be made of hydroxy-terminated butadiene homopolymers (e.g., Poly B-D R-15M which has a hydroxy number of 42 or Poly B-D R-45M). Preferred are butadiene-styrene copolymers.

In addition, use can be made, as the rubbery polymer, of unvulcanized and uncured elastomeric materials formed by copolymerization of one or more of the conjugated dienes described above with one or more ethylenic monomers such as styrene as well as hydroxy, amino and mercapto substituted derivatives thereof, acrylonitrile, methacrylonitrile, acrylic acid, methacrylic acid, etc. Included are butadiene-styrene rubbers, butadiene-acrylonitrile rubbers, etc. Hydroxy-terminated copolymers are likewise useful in the practice of this invention, including the hydroxy-terminated butadiene-styrene copolymer designated "Poly B-D CS-15" and hydroxy-terminated butadiene-acrylonitrile copolymers (e.g., Poly B-D CN-15 having a hydroxyl number of 39).

In carrying out the reaction of the asphalt with the vinyl aromatic monomers, the rubbery polymer and the reclaimed rubber, it has been found that no catalysts are required, although free radical catalysts may be used. It is sufficient that the mixture of the asphalt, vinyl aromatic monomer, the reclaimed rubber and the rubbery polymer be heated to a temperature ranging from 200°–500° F. to promote the reaction. As will be appreciated by those skilled in the art, the reaction time is somewhat dependent on the reaction temperature with higher temperatures favoring a more rapid rate of reaction. If desired, the asphalt can be, prior to reaction with the vinyl aromatic monomers and the rubber components, dissolved in an inert organic solvent, preferably an aromatic solvent, although the use of the solvent is not necessary. It is generally preferred to carry out the reaction under non-oxidizing conditions to avoid combustion. Use of a vacuum or an inert gas can be made for that purpose.

The relative proportions of the vinyl aromatic monomer, the rubbery and the reclaimed rubber are not critical and can be varied within relatively wide ranges. Best results are generally achieved when the vinyl aromatic monomer is employed in an amount corresponding to 0.5 to 35% based on the weight of the asphalt and the total rubber content is used in an amount ranging from 0.5 to 30% by weight, based upon the weight of the asphalt.

It is generally preferred that the weight proportion of the reclaimed rubber component to the rubbery polymer be within the range of 0.2 to 0.8. However, if desired, the rubbery polymer can be omitted altogether; usually better compatibility is achieved when some unvulcanized rubbery polymer is present in the reaction mixture.

In carrying out the reaction used to produce chemically modified asphalts of this invention, use can be made of ordinary asphalt or asphalt which has been modified by reaction with air (e.g., blown asphalt), steam, ammonia or organic amines as described in U.S. Pat. No. 4,166,752.

It has been found that the interreaction of a vinyl aromatic monomer and the rubbers with the asphalt produces a highly cross linked asphalt which is non-tacky at ordinary temperatures. The resulting asphalt, having improved compressive strength, can thus be used in a variety of applications. For example, the asphalt compositions of this invention are highly suitable for use in road paving applications wherein the asphalt is optionally reinforced with glass, either in the form of glass fibers or in the form of glass frit or flake. It is believed that the reaction of the vinyl aromatic compound and the rubbers serves to impart to the asphalt reactive groups which are capable of establishing a chemical bond between the asphalt and glass used as reinforcement.

In addition, asphalt compositions of this invention can also be used in applications where asphalt is reinforced with a siliceous filler other than glass or in addition to glass, notably including siliceous aggregates.

In one form of the invention, the asphalt compositions of this invention can be used in the treatment of glass fibers to improve the bonding relationship between the glass fibers and a wide variety of materials reinforced with glass, and preferably glass fibers which have been sized with an organo silicon compound as a coupling agent. For example, the asphalt compositions of the invention can be applied as a thin coating to individual glass fiber filaments, or as an impregnant to bundles of glass fibers whereby the asphalt coating or impregnant served to intertie the glass fiber surfaces with, for example, treated or untreated asphalt used in road paving applications. In this embodiment of the invention, the coated or impregnated glass fibers can advantageously be used as reinforcement for unmodified asphalt in road paving applications whereby the asphalt matrix of the road paving material is chemically bonded to the coating or the impregnant to the glass fibers. The asphalt forming the coating or impregnant, in turn, serves to intertie the chemically modified asphalt of this invention with the untreated asphalt, the latter forming a continuous phase in which the coated or impregnated glass fibers are distributed as reinforcement.

In the preferred practice of the invention, the chemically modified asphalt is employed in road paving applications, usually blended with glass fibers to provide reinforcement for the asphalt. The chemically modified asphalt is particularly well suited for use in the repair of asphalt pavement because the asphalt of the invention, at least partially by reason of its improved compressive strength as a result of chemical modification, has greater strength and compatibility with glass fibers as compared to untreated asphalt.

In addition, the asphalt-treated glass fibers of this invention can also be used as reinforcement for other materials, including, but not limited to, rubber in the manufacture of glass fiber-reinforced elastomeric products, such as tires, and plastics, as in the manufacture of glass fiber-reinforced plastics. In addition, glass fibers treated with the chemically modified asphalt of this invention can be used in the repair of "potholes". In that application, glass fibers, preferably in the form of a woven roving, are embedded in a blend of asphalt and aggregate used to fill the pothole in roads to provide increased strength for the asphalt employed in filling the pothole. Glass fibers prepared in accordance with the practice of this invention can also be used in a like manner in the repair of cracks whereby the glass fibers with the asphalt coating thereon markedly increase the strength of such repairs, thereby assuring improved durability.

When used in the coating or impregnation of glass fibers or bundles of glass fibers, respectively, use can be made of asphalt compositions of this invention in amounts over relatively wide ranges. Generally, the coating or impregnant is applied in an amount sufficient to constitute from 0.1 to about 50% by weight, or even higher, of the weight of the glass fibers.

Having described the basic concepts of the present invention, reference is now made to the following examples, which are provided by way of illustration and not by way of limitation, of the practice of this invention in the preparation of chemically modified asphalts and their use.

EXAMPLE 1

This example illustrates the use of reclaimed rubber as a partial replacement for a butadiene-styrene rubber in which the rubber components are chemically bonded to asphalt using styrene as the vinyl aromatic linking monomer.

Into a resin kettle, there is placed 775 parts by weight of a paving grade asphalt (50/60 penetration at 77° F.) and 100 parts by weight of styrene. The mixture is blended together and the temperature is raised to 110° C. Thereafter, 62.5 parts by weight of butadiene-styrene rubber (Solprene 1205) and 62.5 parts by weight of reclaimed rubber are blended together and then added to the asphalt styrene mixture. The temperature of the resulting blend is raised to 160° C. and maintained at that temperature for 24 hours. At the end of that time, the reaction mixture is discharged to yield a homogeneous material, exhibiting no evidence of staining or tracking. The resulting rubber-modified asphalt is substantially free from tackiness and can be used with or without conventionally sized glass fibers in the repair of roads and the like.

EXAMPLE 2

The procedure of Example 1 is repeated using a butadiene polymer having a molecular weight of approximately 1500 and styrene as the vinyl aromatic monomer. Comparable results are obtained.

EXAMPLE 3

Using the procedure described in Example 1, a blown asphalt having an oxygen content of 0.78% by weight is reacted with styrene, a butadiene-acrylonitrile rubber and reclaimed rubber. Thereafter, 0.12 parts by weight of phthalic anhydride are added to the chemically modified asphalt which is then applied as a coating on glass fibers which have been sized with delta-hydroxybutyl-trimethoxysilane. A secure bond between the chemically-modified asphalt and the glass fibers is achieved.

EXAMPLE 4

The procedure of Example 3 is repeated, except that the asphalt employed is an ammonia modified asphalt having a nitrogen content of 1.28% by weight.

After the butadiene-acrylonitrile rubber and reclaimed rubber are chemically bonded to the asphalt with the styrene, 0.8% by weight of the epoxide resin DER 732 is added to cross link the asphalt and render it substantially free of tack at ambient temperatures.

It will be understood that various changes and modifications can be made in the details of procedure, formulation and use without departing from the spirit of the invention, especially as defined in the following claims.

We claim:

1. A chemically-modified asphalt composition comprising an asphalt which has been reacted with (1) a polymerizable vinyl aromatic monomer, (2) a rubbery polymer which is at least partially uncured and/or unvulcanized and (3) reclaimed rubber.

2. A chemically modified asphalt as defined in claim 1 wherein the rubbery polymer is selected from the group consisting of homopolymers of a conjugated diene and copolymers formed of a conjugated diene and at least one ethylenic monomer copolymerizable therewith.

3. A chemically modified asphalt as defined in claim 2 wherein the ethylenic monomer is selected from the group consisting of styrene, acrylonitrile, methacrylonitrile, acrylic acid, methacrylic acid, hydroxystyrene, aminostyrene and mercaptostyrene.

4. A chemically modified asphalt as defined in claim 1 wherein the asphalt is an asphalt which has been pre-reacted with a modifying agent selected from the group consisting of steam, an oxygen-containing gas, ammonia and organic amines.

5. A chemically modified asphalt as defined in claim 1 wherein the vinyl aromatic monomer is reacted in an amount within the range of 0.5 to 35% based upon the weight of the asphalt.

6. A chemically modified asphalt as defined in claim 1 wherein the total of (2) and (3) is an amount ranging from 0.5 to 30% by weight based on the weight of the asphalt.

7. A chemically modified asphalt as defined in claim 1 wherein the weight ratio between (1) and (2) is within the range of 0.2 and 0.8.

8. A chemically modified asphalt composition comprising asphalt which has been reacted with (1) a polymerizable vinyl aromatic monomer and (2) reclaimed rubber.

9. A chemically modified asphalt as defined in claim 8 wherein the vinyl aromatic monomer is reacted in an amount within the range of 0.5 to 30% by weight based upon the weight of the asphalt.

10. A chemically modified asphalt as defined in claim 8 wherein the reclaimed rubber is reacted in an amount within the range of 0.5 to 30% by weight based upon the weight of the asphalt.

11. A chemically modified asphalt as defined in claim 1 wherein the vinyl aromatic monomer is a monovinyl monomer.

12. A chemically modified asphalt as defined in claim 1 wherein the vinyl aromatic monomer is styrene.

13. Glass fibers having a coating thereon, said coating comprising a chemically modified asphalt as defined in claim 1.

14. Glass fibers as defined in claim 13 wherein the glass fibers are in the form of a bundle and the coating constitutes an impregnant in the bundle.

15. Glass fibers as defined in claim 13 wherein the glass fibers contain on the surfaces thereof a thin film coating of an organo silane.

16. In a glass fiber reinforced asphalt wherein an asphalt constitutes a continuous phase in which the glass fibers are distributed as reinforcement, the improvement comprising a chemically modified asphalt as defined in claim 1.

* * * * *